US007996672B1

(12) United States Patent
Agrawal et al.

(10) Patent No.: US 7,996,672 B1
(45) Date of Patent: Aug. 9, 2011

(54) SUPPORT FOR MULTIPLE DIGITAL RIGHTS MANAGEMENT SYSTEMS FOR SAME CONTENT

(75) Inventors: Sunil C. Agrawal, Milpitas, CA (US); Katherine K. Nadell, San Jose, CA (US); Viswanathan Swaminathan, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 890 days.

(21) Appl. No.: 11/951,266

(22) Filed: Dec. 5, 2007

(51) Int. Cl.
*H04L 9/00* (2006.01)
*H04L 9/32* (2006.01)
*H04N 7/167* (2006.01)

(52) U.S. Cl. .......... 713/165; 713/189; 380/201

(58) Field of Classification Search .......... 380/200–203, 380/29, 37; 713/165–167, 176, 189, 193–194, 713/171; 726/26–31; 705/51, 57–59
See application file for complete search history.

(56) References Cited

U.S. PATENT DOCUMENTS 7,421,741 B2 * 9/2008 Phillips et al. .................. 726/30
7,627,753 B2 * 12/2009 Whitten et al. ............... 713/161

OTHER PUBLICATIONS

ISMA Encryption and Authentication, Version 2.0 International Streaming Media Association (ISMA) of San Francisco, CA. Date Apr. 2007.
"DRM Content Format", Approved Version 2.0, Open Mobile Alliance of La Jolla, CA, Date Mar. 3, 2006.

* cited by examiner

*Primary Examiner* — Hosuk Song
(74) *Attorney, Agent, or Firm* — Fish & Richardson P.C.

(57) ABSTRACT

Methods, systems, and apparatus, including medium-encoded computer program products, for protecting a document with multiple digital rights management systems are presented. One or more aspects of the subject matter described in this specification can be embodied in one or more methods of protecting a document with multiple digital rights management systems, the one or more methods including: obtaining a document, wherein the document includes encrypted content and a first header, wherein the encrypted content has been encrypted in accordance with a first digital rights management scheme using a key and an encryption scheme, wherein the first header was generated in accordance with the first digital rights management scheme in association with the encrypted content; producing a second header associated with the encrypted content in accordance with a second digital rights management scheme; and creating a protected document including the first header, the second header, and the encrypted content.

22 Claims, 5 Drawing Sheets

SUPPORT FOR MULTIPLE DIGITAL RIGHTS MANAGEMENT SYSTEMS FOR SAME CONTENT

BACKGROUND

This specification relates to modifying the digital rights management (DRM) system used to protect content. DRM systems are used to control a user's access and/or rights to content stored within an electronic document.

One particular DRM system is described by the Open Mobile Alliance (OMA) DRM version 2.0 system specification; the specification available from Open Mobile Alliance of La Jolla, Calif. An OMA document entitled "DRM Content Format" for version 2.0 is also available from OMA. OMA DRM is a common mobile phone DRM system. Another DRM system is described by the International Streaming Media Association (ISMA) specification entitled "ISMA Encryption and Authentication, Version 2.0" which is available from the International Streaming Media Association (ISMA) of San Francisco, Calif.

SUMMARY

This specification describes technologies relating to support for multiple DRM systems for same content. In general, one aspect of the subject matter described in this specification can be embodied in one or more methods of protecting a document with multiple digital rights management systems, the one or more methods including: obtaining a document, wherein the document includes encrypted content and a first header, wherein the encrypted content has been encrypted in accordance with a first digital rights management scheme using a key and an encryption scheme, wherein the first header was generated in accordance with the first digital rights management scheme in association with the encrypted content; producing a second header associated with the encrypted content in accordance with a second digital rights management scheme; and creating a protected document including the first header, the second header, and the encrypted content. Other embodiments of this aspect include corresponding systems, apparatus, and computer program products.

These and other embodiments can optionally include one or more of the following features. Obtaining the document can include creating the encrypted content and the first header. The second header can be placed after the first header in the protected document. The document can include additional encrypted content and an additional first header, wherein the additional encrypted content has been encrypted in accordance with the first digital rights management scheme using the key and the encryption scheme, wherein the additional first header was generated in accordance with the first digital rights management scheme in association with the additional encrypted content; the method further including: producing an additional second header associated with the additional encrypted content in accordance with a second digital rights management scheme; and the protected document further including the additional first header, the additional second header, and the additional encrypted content. Obtaining the document can include creating the additional encrypted content and the additional first header. Producing a second header can include a server corresponding to the second digital rights management scheme with the key from a server corresponding to the first digital rights management scheme.

Another aspect of the subject matter described in this specification can be embodied in one or more methods of protecting a document with multiple digital rights management systems, the one or more methods including: receiving a file, wherein the file includes encrypted content, a first header, and a second header, wherein the encrypted content has been encrypted in accordance with a first digital rights management scheme, wherein the first header was generated in accordance with a first digital rights management scheme in association with the encrypted content, wherein the second header was generated in accordance with a second digital rights management scheme in association with the encrypted content; and decrypting the encrypted content by use of either the first digital rights management scheme or the second digital rights management scheme. Other embodiments of this aspect include corresponding systems, apparatus, and computer program products. These and other embodiments can optionally include one or more of the following features. The second header can be placed after the first header in the protected document.

Particular embodiments of the subject matter described in this specification can be implemented to realize one or more of the following advantages. When distributing a DRM protected document to multiple computer platforms, the computer platform should have a player or viewer capable of understanding the DRM scheme. In a heterogeneous set of computer platforms, which can include personal computers, mobile phones, and/or personal data assistants (PDAs), the availability of a certain DRM player can vary. A DRM system geared towards mobile phones may not be available to a personal computer. A DRM system geared towards the personal computer may not be found on a mobile phone. The protected (encrypted) content within a document can be described by the use of headers contained within the document. Players can use header information to decode the encrypted contents. While two DRM systems can encrypt content the same way, their corresponding headers can be different. One DRM system A can take the encrypted contents of a document protected by DRM system B and copy the encrypted contents into a document protected by system A. However, because system A uses a different scheme for its header, a player/viewer associated with system B would not be able to view the document protected by system A. It is an advantage for a document to be protected in such a way that the document is playable/viewable on multiple DRM systems without duplicating the protected contents within the document, i.e., distributing encrypted content protected by system A and distributing the same encrypted content protected by system B either within the same document or through multiple documents.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An electronic document (which for brevity will simply be referred to as a document) does not necessarily correspond to a file. A document may be stored in a portion of a file that holds other documents, in a single file dedicated to the document in question, or in multiple coordinated files. The document need not be a text file or a document in the sense of a word processor. The document can include audio, video, images, and data content. In other examples, the document can be any audio, video, image, or data file. Also the document can be streaming versions of the aforementioned document types. In addition, although specific terminology is used for the example DRM systems and schemes discussed below, it will be understood that these are merely examples (provided for the purpose of clarity in the disclosure) of the general elements of DRM systems and schemes with which the present techniques can be employed.

Figure 1:
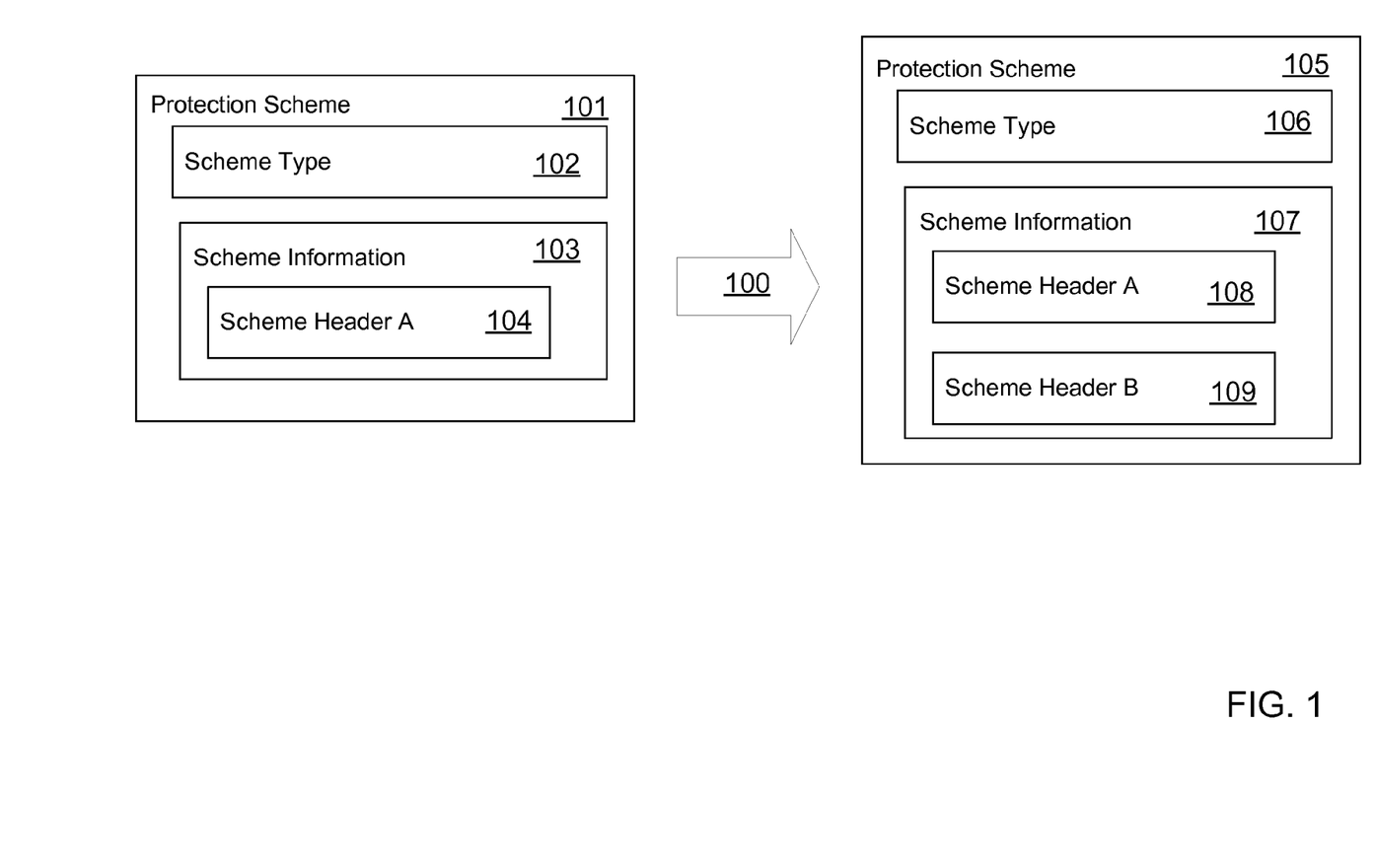
FIG. 1 shows an example transformation of a DRM header.

FIG. 1 shows one example of an addition of a second DRM scheme to pre-existing DRM scheme data within a document in a transformation process 100. The document can contain one or more Protection Schemes. A Protection Scheme can contain data about the DRM scheme or schemes that can be in use within the document. Protection Scheme 101 can contain a Scheme Type 102 and a Scheme Information 103. The Scheme Type 102 can specify which DRM scheme is in use. Scheme Information 103 can be a container for the scheme information of the DRM scheme or schemes used within the document. Scheme Header A 104, within Scheme Information 103, can contain DRM scheme header information for the DRM scheme specified by Scheme Type 102. When a second DRM scheme is added, Protection Scheme 101 can be transformed to into Protection Scheme 105. Scheme Type 106 can duplicate the information contained in Scheme Type 102. The data needed by the second DRM system, Scheme Header B 109, can be inserted after Scheme Header A 108 within the Scheme Information 107. Scheme Header A 108 can duplicate Scheme A 104. The Protection Scheme 105 can be understood by the original DRM system because the location of Scheme A 104 is preserved, i.e., Scheme A 108 appears first within the Scheme Information 107. The second DRM system can be configured to bypass Scheme Header A 108 to obtain Scheme Header B 109 information. The associated encrypted content remains the same between the document containing Protection Scheme 101 and the document containing Protection Scheme 105. The encrypted content can represent any, but is not limited to, image, video, audio, or text data. Also, the encrypted content can represent combinations of any or all of the following: image, video, audio, text, and generic data.

In another example, the file format of FIG. 1 can follow the ISO 14496-12 standard entitled "Information technology—Coding of audio-visual objects—Part 12: ISO base media file format." In which, Protection Scheme 101 can be constructed in accordance to a ProtectionSchemeInfoBox. Scheme Type 102 can be constructed in accordance to a SchemeTypeBox. Scheme Information can be constructed in accordance to a SchemeInformationBox.

Figure 2:
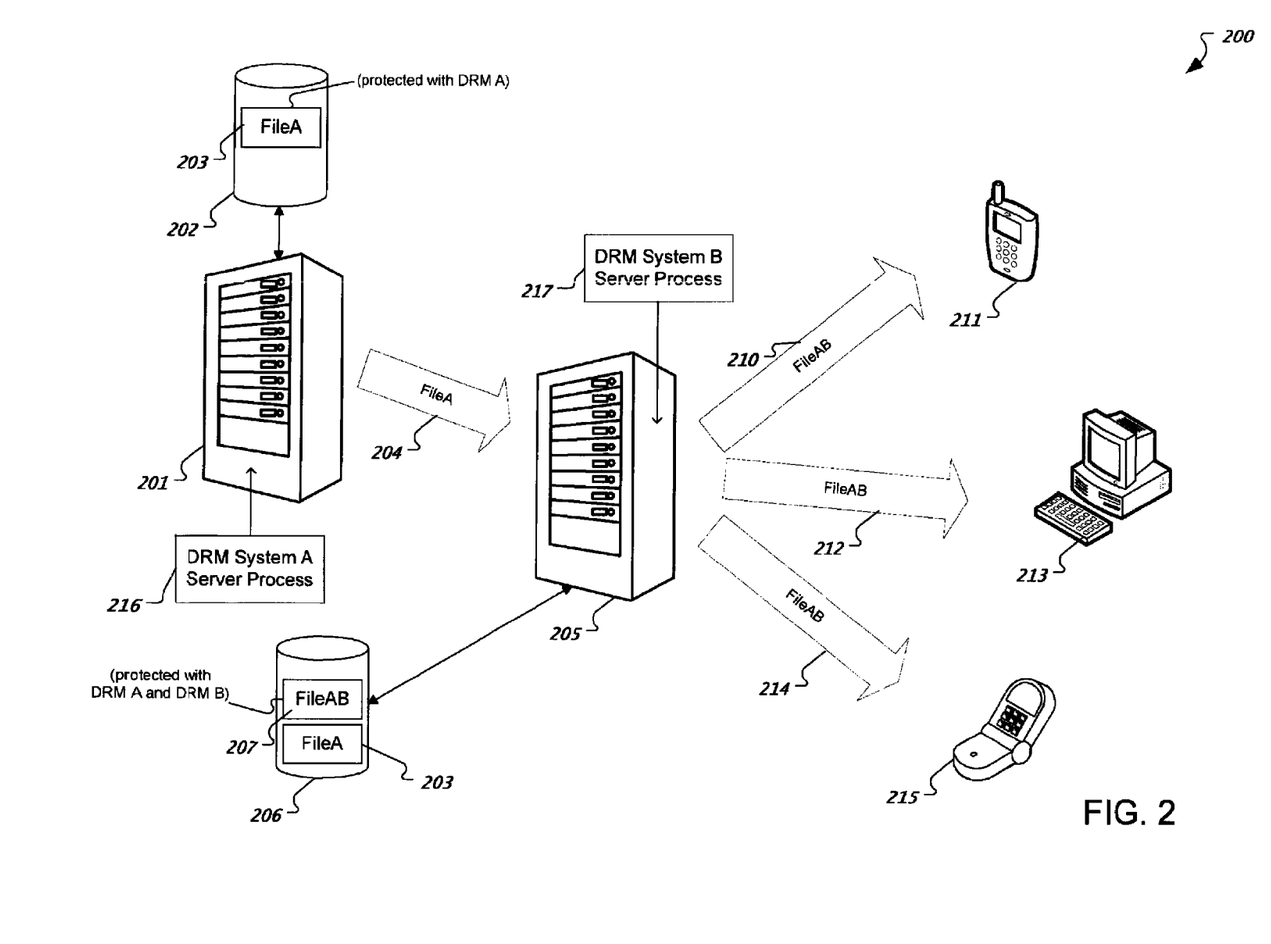
FIG. 2 shows an example document distribution system where the document is protected by two DRM systems.

FIG. 2 shows one example of a document distribution system 200 wherein the document becomes protected by two DRM systems. A server 201 has an associated electronic storage medium 202 that contains FileA 203. FileA 203 can be protected by DRM system A. Server 201 can transmit FileA 203 to server 205. Server 205 can store FileA 203 on an associated electronic storage medium 206. Server 205 obtains FileA 203 either by receiving the file from a network 204 or by retrieving the file from medium 206. After server 205 obtains FileA 203, the server 205 can be configured to add the additional protection of DRM system B to FileA 203 to produce FileAB 207. In some embodiments, a server different from server 205 can be used to add the additional protection of DRM system B. The server 205 can distribute the FileAB 207 to various computing devices including mobile phones 211, 215 and personal computer 213 over various communication channels 210, 212, 214. Personal computer 213 can view the FileAB 207 using either DRM system. Mobile phones 211, 215 can view the FileAB 207 using either DRM system. In some embodiments, DRM System A is the OMA DRM system and DRM System B is the ADOBE® DRM system used by FLASH® Video (F4V) documents. The ADOBE® DRM system is available from Adobe Systems Incorporated of San Jose, Calif.

In some embodiments, server 201 can host a DRM System A Server Process 216 and server 205 can host the DRM System B Server Process 217. In some embodiments, DRM System B Server Process 217 can be the ADOBE® LIVECYCLE® Rights Management server process for the ADOBE® DRM system and DRM System A Server Process 216 can be an OMA digital rights management server process for the OMA DRM system. In other embodiments, either server process 216, 217 or both can reside on one or more servers different from servers 201, 205. Both server processes 216, 217 can access their own central database that stores all of the content related policy information, e.g., expiration dates. Both OMA DRM and ADOBE® DRM can provide import and/or export capabilities for content keys. When creating FileAB 207, the associated content key can be exported from the OMA DRM server process and imported into the ADOBE® DRM server process. When FileAB 207 is viewed from an OMA DRM player, the OMA DRM related server process can be used. When FileAB 207 is viewed from an ADOBE® DRM player, the ADOBE® DRM related server process can be used. In some embodiments, the key for decryption can be stored within the document using a password protection scheme.

Figure 3:
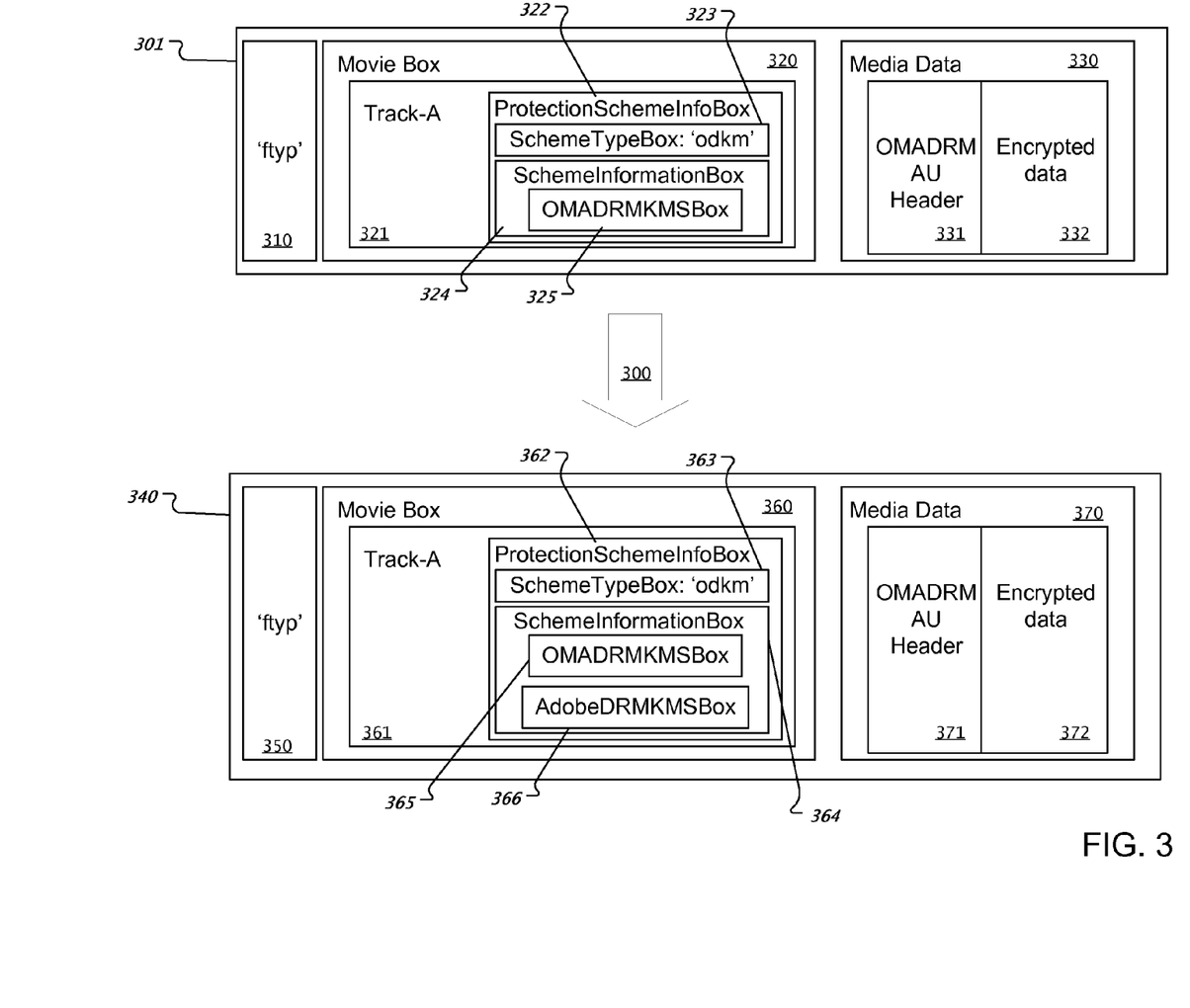
FIG. 3 shows an example transformation of a document using one DRM system to a document using two DRM systems.

FIG. 3 shows an example of a transformation process 300 of a document 301, using the OMA DRM system, to a document 340 using the OMA and ADOBE® DRM systems. In other embodiments, different DRM systems can be used. Documents 301, 340 can follow, but are not limited to, the ISO 14496-12 format. Document 301 contains a file type descriptor 310, a movie box 320, and media data 330. The movie box 320 can describe the contents of the media data 330. Movie box 320 is not limited to describing movie data, but can describe other content. The movie box 320 can contain one or more tracks, e.g., Track-A 321. Each track can contain one or more sample descriptions that describe sample data (also called content). In this example, Track-A 321 contains one sample description and a corresponding ProtectionSchemeInfoBox 322. ProtectionSchemeInfoBox 322 can be used to describe the protection scheme used for the sample description. ProtectionSchemeInfoBox 322 contains a SchemeTypeBox 323 and a SchemeInformationBox 324. The SchemeTypeBox 323 can be set to 'odkm' which indicates that the OMA DRM system is in use. The SchemeInformationBox 324 contains an OMADRMKMSBox 325. The OMADRMKMSBox 325 contains OMADRMCommonHeaders and OMADRMAUFormatBox. The OMADRMAUFormatBox contains a Selective Encryption (1 bit), reserved (7 bits), Key Indicator Length (unsigned 8 bit int), and IV Length fields (unsigned 8 bit int).

The media data 330 can contain one or more access units. An access unit contains an access unit header and sample data. In some embodiments, the sample data can be either audio or video data or both. When a document is protected by a DRM system, the sample data can be encrypted. The media data 330 contains an access unit that includes an OMADRMAUHeader 331 and encrypted data (encrypted content) 332. The format of the OMADRMAUHeader box can be specified by the OMADRMAUFormatBox within the OMADRMKMSBox 325. The contents of the OMADRMAUHeader box can inform a user, viewer, player, etc. how to decrypt the encrypted data 332. In one example, the data represented by encrypted data 332 can be encrypted using the Advanced Encryption Standard (AES) encryption scheme in Cipher Block Chaining (CBC) Mode (AES-CBC) where the length of the encryption key can be 128 bits. In some embodiments, one key can be used to encrypt multiple sample data.

The transformation process 300 can be configured to copy over the file type descriptor 310 and media data 330 into document 340 as file type descriptor 350 and media data 370. OMADRMAUHeader 331 can be copied to OMADRMAUHeader 371. Encrypted data 332 can be copied to encrypted data 372, the data represented by encrypted data 332, 372 can remain encrypted during the copy process. When copying over the movie box 320, a new movie view box 360 can be created. The ProtectionSchemeInfoBox 322 of Track-A 321 can be copied over to ProtectionSchemeInfoBox 362 within Track-A 361, while copying over SchemeInformationBox 324 into SchemeInformationBox 364, AdobeDRMKMSBox 366 can be appended after the OMADRMKMSBox 365 within SchemeInformationBox 362. The AdobeDRMKMSBox 366 can be created in accordance with the ADOBE® DRM system. AdobeDRMKMSBox 366 contains an AdobeDRMHeaderBox and an AdobeDRMAUFormatBox. The AdobeDRMAUFormatBox contains a Selective Encryption (1 bit), reserved (7 bits), Key Indicator Length (unsigned 8 bit int), and IV Length fields (unsigned 8 bit int); where each field is populated with the value of the corresponding field in the OMADRMAUFormatBox of OMADRMKMSBox 325. The SchemeTypeBox 363 can remain the same as SchemeTypeBox 323, e.g., 'odkm.' In other embodiments, the changes described in the transformation process 300 can be performed in situ—alleviating the need for creating a separate document.

Figure 4:
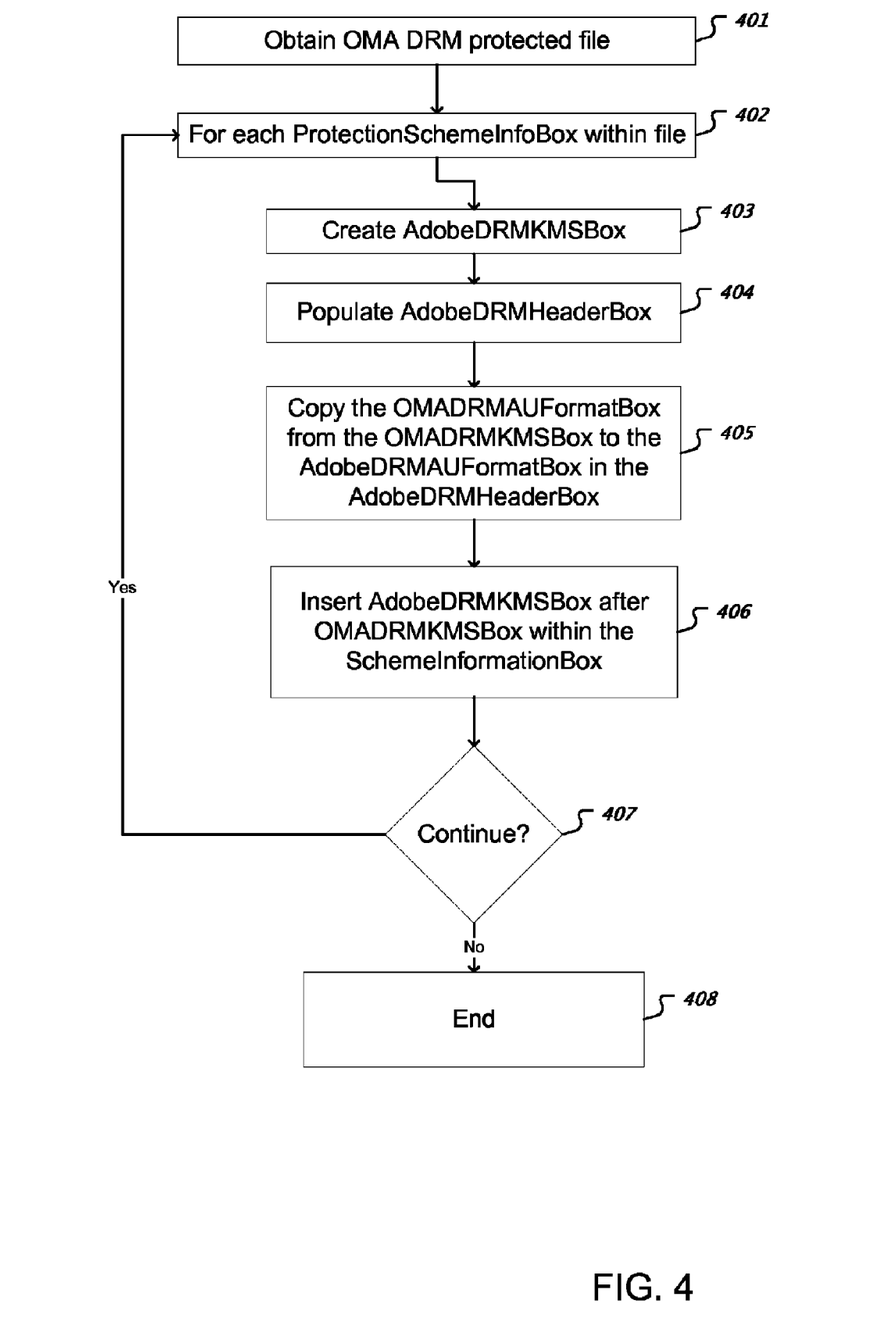
FIG. 4 is a flowchart of an example transformation process.

FIG. 4 shows one example of a transformation process taking a document protected by one DRM system to a document protected by two DRM systems. An OMA DRM protected file can be obtained 401, where obtaining can mean receiving or retrieving. A loop iterates 402 through each ProtectionSchemeInfoBox contained in the document. For the current ProtectionSchemeInfoBox, an AdobeDRMKMSBox can be created 403. The AdobeDRMHeaderBox within the AdobeDRMKMSBox can be populated 404 with data according to the ADOBE® DRM scheme. The contents of the OMADRMAUFormatBox within the OMADRMKMSBox can be copied 405 into the AdobeDRMAUFormatBox within the AdobeDRMHeaderBox. The AdobeDRMKMSBox can be inserted 406 after the OMADRMKMSBox within the SchemeInformationBox. If there are more ProtectionSchemeInfoBoxes to process 407, the loop continues to the next ProtectionSchemeInfoBox 402, otherwise the process terminates 408. It is understood that these actions can comprise additional actions or reordering of the said actions to accommodate additional functionality.

Referring again to FIG. 3, when an OMA DRM compliant player or viewer parses document 340, i.e., protected by OMA DRM and ADOBE® DRM, the player will recognize document 340 has being protected by OMA DRM because the SchemeType is 'odkm.' The OMA DRM player expects the associated DRM information, e.g., OMADRMKMSBox 365, to appear first in the SchememInformationBox 364. Because OMADRMKMSBox 365 appears first, an OMA DRM player will be able to parse and/or understand the document 340. The OMA DRM player will ignore the additional AdobeDRMKMSBox appearing after the OMADRMKMSBox 365.

When an ADOBE® DRM compliant player or viewer parses document 340, the player can be configured to recognize file 340 has being protected by OMA DRM. The player can proceed to check for the existence of an AdobeDRMKMSBox after an OMADRMKMSBox. The check can include checking whether or not a type indicator, as defined by the ISO 14496-12 Specification, of the box is 'adkm'; 'adkm' can be the type indicator for the ADOBE® DRM scheme. When the player finds the AdobeDRMKMSBox, the player can be configured to process the document as if the SchemeType had been 'adkm,' i.e., ADOBE® DRM. If the player does not find the AdobeDRMKMSBox, the ADOBE®DRM compliant player will be unable to play or view the protected content. In the case of multiple ProtectionSchemeInfoBoxs in a file, this process of checking can be carried out for each.

Figure 5:
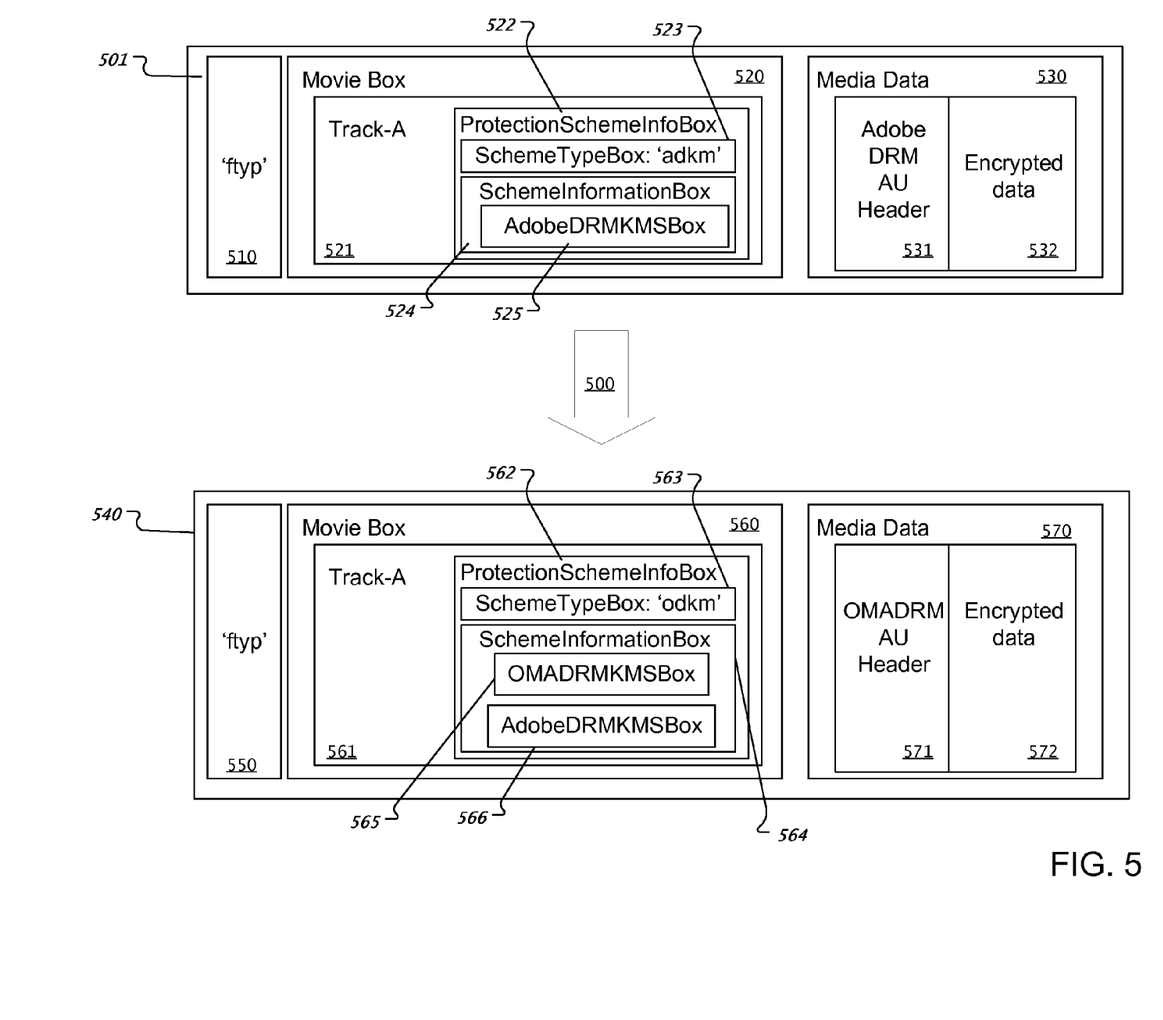
FIG. 5 shows another example transformation of a document using one DRM system to a document using two DRM systems.

FIG. 5 shows one example of an alternate transformation process 500 of a document 501, using the ADOBE® DRM system, to a document 540 using the OMA and ADOBE® DRM systems. In other embodiments, different DRM systems can be used. Documents 501, 540 can follow the ISO 14496-12 format. Document 501 contains a file type descriptor 510, a movie box 520, and media data 530. The movie box 520 can describe the contents of the media data 530. The movie box 520 can contain one or more tracks, e.g., Track-A 521. Each track can contain one or more sample descriptions. In this example, Track-A 521 contains one sample description and a corresponding ProtectionSchemeInfoBox 522. ProtectionSchemeInfoBox 522 can be used to describe the protection scheme used for the sample description. ProtectionSchemeInfoBox 522 contains a SchemeTypeBox 523 and a SchemeInformationBox 524. The SchemeTypeBox 523 can be set to 'adkm' which indicates that the ADOBE® DRM system is in use. The SchemeInformationBox 524 contains an AdobeDRMKMSBox 525. The AdobeDRMKMSBox 525 contains header information. One element of the header information can be the AdobeDRMAUFormatBox. The AdobeDRMAUFormatBox contains a Selective Encryption (1 bit), reserved (7 bits), Key Indicator Length (unsigned 8 bit int), and IV Length fields (unsigned 8 bit int).

The media data 530 can contain one or more access units. An access unit contains an access unit header and sample data. When a document is protected by a DRM system, the sample data can become encrypted. The media data 530 contains a access unit that includes an AdobeDRMAUHeader 531 and encrypted data 532. The format of the AdobeDRMAUHeader box can be specified by the AdobeDRMAUFormatBox within the AdobeDRMKMSBox 525. The contents of the AdobeDRMAUHeader box can inform a user, viewer, player, etc. how to decrypt the encrypted data (content) 532. In one example, encrypted data 532 can be encrypted using the Advanced Encryption Standard (AES) encryption scheme in Cipher Block Chaining (CBC) Mode (AES-CBC) where the length of the encryption key can be 128 bits. In some embodiments, one key can be used to encrypt multiple sample data.

The transformation process 500 can be configured to copy over the file type descriptor 510 and media data 530 into document 540 as file type descriptor 550 and media data 570. AdobeDRMAUHeader 531 can be copied over into OMADRMAUHeader 571, while the name has changed, the header data can remain the same. Encrypted data 532 can be copied to encrypted data 572, the data represented by encrypted data 532, 572 can remain encrypted during the copy process. When copying over the movie box 520, a new movie view box 560 can be created. The ProtectionSchemeInfoBox 522 of Track-A 521 can be copied over to ProtectionSchemeInfoBox 562 within Track-A 561, while copying over SchemeInformationBox 524 into SchemeInformationBox 564, OMADRMKMSBox 566 can be inserted as the first box within SchemeInformationBox 564. The OMADRMKMSBox can be created from document 501 in accordance with the OMA DRM Specification; the OMADRMAUFormatBox can be a copy of the AdobeDRMAUFormatBox. The AdobeDRMKMSBox 525 can be inserted after the OMADRMKMSBox 565 to become AdobeDRMKMSBox 566. The SchemeTypeBox 563 can denote 'odkm.' In other embodiments, the changes described in the transformation process 500 can be performed in situ—alleviating the need for a creating a separate document.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, DRM systems other than those discussed above can be used, i.e., other DRM systems can be used instead of the ADOBE® DRM system, or the OMA DRM system, or both systems. In another example, the actions recited in the claims can be performed in a different order and still achieve desirable results.

What is claimed is:

1. A computer-implemented method comprising:
   obtaining a document, wherein the document comprises encrypted content and a first header, wherein the encrypted content has been encrypted in accordance with a first digital rights management scheme using a key and an encryption scheme, wherein the first header was generated in accordance with the first digital rights management scheme in association with the encrypted content;
   producing a second header associated with the encrypted content in accordance with a second digital rights management scheme; and
   creating a protected document comprising the first header, the second header, and the encrypted content.

2. The method of claim 1, wherein obtaining the document comprises creating the encrypted content and the first header.

3. The method of claim 1, wherein the second header is placed after the first header in the protected document.

4. The method of claim 1, wherein the obtained document comprises additional encrypted content and an additional first header, wherein the additional encrypted content has been encrypted in accordance with the first digital rights management scheme using the key and the encryption scheme, wherein the additional first header was generated in accordance with the first digital rights management scheme in association with the additional encrypted content; the method further comprising:
   producing an additional second header associated with the additional encrypted content in accordance with a second digital rights management scheme; and
   the protected document further comprising the additional first header, the additional second header, and the additional encrypted content.

5. The method of claim 4, wherein obtaining the document comprises creating the additional encrypted content and the additional first header.

6. The method of claim 1, wherein producing the second header comprises updating a server corresponding to the second digital rights management scheme with the key from a server corresponding to the first digital rights management scheme.

7. A computer-implemented method comprising:
   receiving a file, wherein the file comprises encrypted content, a first header, and a second header, wherein the encrypted content has been encrypted in accordance with a first digital rights management scheme, wherein the first header was generated in accordance with a first digital rights management scheme in association with the encrypted content, wherein the second header was generated in accordance with a second digital rights management scheme in association with the encrypted content; and
   decrypting the encrypted content by use of either the first digital rights management scheme or the second digital rights management scheme.

8. The method of claim 7, wherein the second header is placed after the first header in the protected document.

9. A computer program product, encoded on a non-transitory computer-readable medium, operable to cause data processing apparatus to perform operations comprising:
   obtaining a document, wherein the document comprises encrypted content and a first header, wherein the encrypted content has been encrypted in accordance with a first digital rights management scheme using a key and an encryption scheme, wherein the first header was generated in accordance with the first digital rights management scheme in association with the encrypted content;
   producing a second header associated with the encrypted content in accordance with a second digital rights management scheme; and creating a protected document comprising the first header, the second header, and the encrypted content.

10. The computer program product of claim 9, wherein obtaining the document comprises creating the encrypted content and the first header.

11. The computer program product of claim 9, wherein the second header is placed after the first header in the protected document.

12. The computer program product of claim 9, wherein the obtained document comprises additional encrypted content and an additional first header, wherein the additional encrypted content has been encrypted in accordance with the first digital rights management scheme using the key and the encryption scheme, wherein the additional first header was generated in accordance with the first digital rights management scheme in association with the additional encrypted content; the operations further comprising:
   producing an additional second header associated with the additional encrypted content in accordance with a second digital rights management scheme; and
   the protected document further comprising the additional first header, the additional second header, and the additional encrypted content.

13. The computer program product of claim 12, wherein obtaining the document comprises creating the additional encrypted content and the additional first header.

14. The computer program product of claim 9, wherein producing the second header comprises updating a server corresponding to the second digital rights management scheme with the key from a server corresponding to the first digital rights management scheme.

15. A computer program product, encoded on a non-transitory computer-readable medium, operable to cause data processing apparatus to perform operations comprising:

receiving a file, wherein the file comprises encrypted content, a first header, and a second header, wherein the encrypted content has been encrypted in accordance with a first digital rights management scheme, wherein the first header was generated in accordance with a first digital rights management scheme in association with the encrypted content, wherein the second header was generated in accordance with a second digital rights management scheme in association with the encrypted content; and decrypting the encrypted content by use of either the first digital rights management or the second digital rights management scheme.

16. The computer program product of claim 15, wherein the second header is placed after the first header in the protected document.

17. A system comprising:

a user interface device; and one or more computers operable to interact with the user interface device and to perform operations comprising:

obtaining a document, wherein the document comprises encrypted content and a first header, wherein the encrypted content has been encrypted in accordance with a first digital rights management scheme using a key and an encryption scheme, wherein the first header was generated in accordance with the first digital rights management scheme in association with the encrypted content;

producing a second header associated with the encrypted content in accordance with a second digital rights management scheme; and creating a protected document comprising the first header, the second header, and the encrypted content.

18. The system of claim 17, wherein obtaining the document comprises creating the encrypted content and the first header.

19. The system of claim 17, wherein the second header is placed after the first header in the protected document.

20. The system of claim 17, wherein the obtained document comprises additional encrypted content and an additional first header, wherein the additional encrypted content has been encrypted in accordance with the first digital rights management scheme using the key and the encryption scheme, wherein the additional first header was generated in accordance with the first digital rights management scheme in association with the additional encrypted content; the operations further comprising:

producing an additional second header associated with the additional encrypted content in accordance with a second digital rights management scheme; and the protected document further comprising the additional first header, the additional second header, and the additional encrypted content.

21. The system of claim 20, wherein obtaining the document comprises creating the additional encrypted content and the additional first header.

22. The system of claim 17, wherein producing the second header comprises updating a server corresponding to the second digital rights management scheme with the key from a server corresponding to the first digital rights management scheme.

* * * * *